Figure 1:
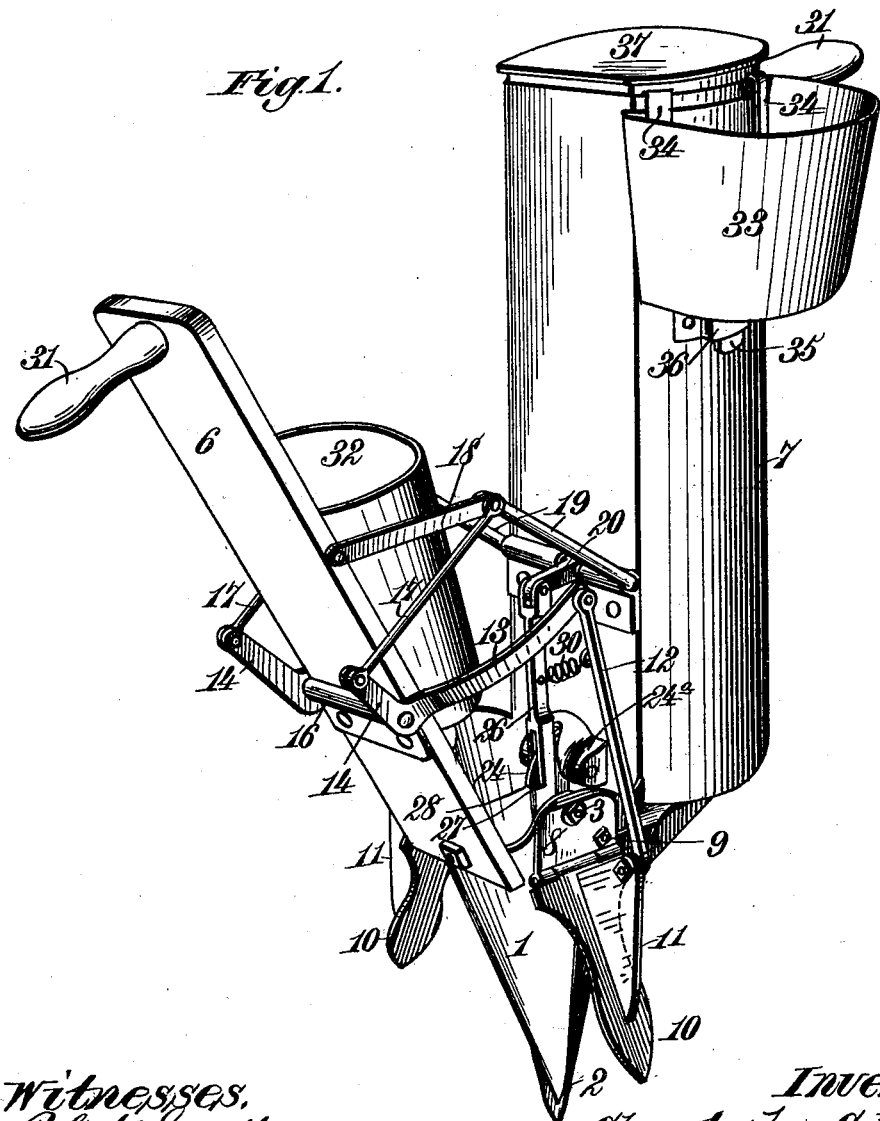

No. 626,614. Patented June 6, 1899.
C. G. HIGGINS.
HAND TOBACCO SETTER.
(Application filed Aug. 20, 1898.)
(No Model.) 2 Sheets—Sheet 1.

Witnesses.
Robert Emmett
[signature]

Inventor:
Christopher G. Higgins.
By James L. Norris
Att'y.

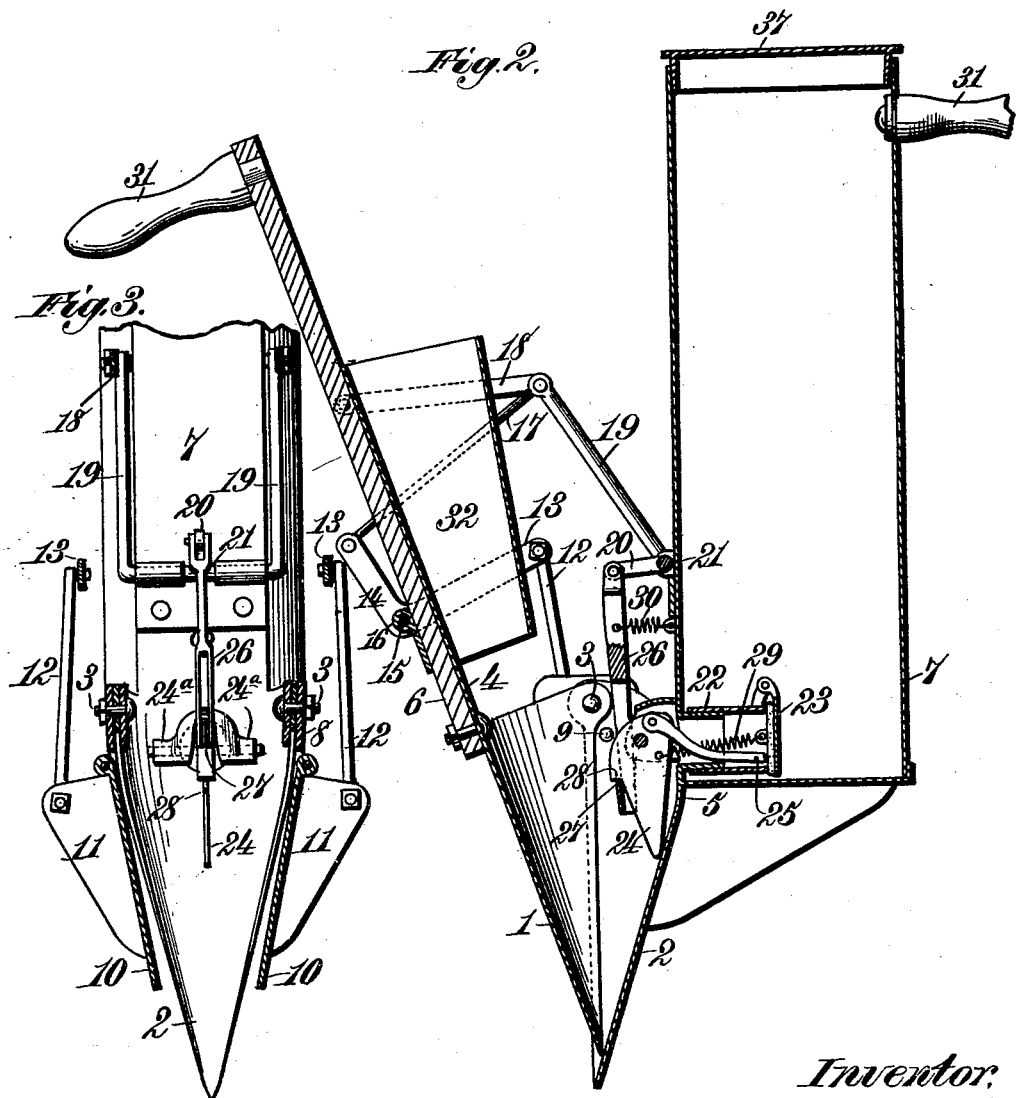

UNITED STATES PATENT OFFICE.

CHRISTOPHER G. HIGGINS, OF FALMOUTH, KENTUCKY.

HAND TOBACCO-SETTER.

SPECIFICATION forming part of Letters Patent No. 626,614, dated June 6, 1899.

Application filed August 20, 1898. Serial No. 689,147. (No model.)

*To all whom it may concern:*

Be it known that I, CHRISTOPHER G. HIGGINS, a citizen of the United States, residing at Falmouth, in the county of Pendleton and State of Kentucky, have invented new and useful Improvements in Hand Tobacco-Setters, of which the following is a specification.

This invention relates to tobacco-plant setters, and has for its object to provide a simple, inexpensive, and efficient device adapted to be operated by hand and by means of which the tobacco-plants may be rapidly set out or planted with little labor, the plants watered, and the moist earth pressed or compacted about the roots.

To these ends my invention consists in the features and in the construction, combination, and arrangement of parts hereinafter described, and particularly pointed out in the claims following the description, reference being had to the accompanying drawings, forming a part of this specification, wherein—

Figure 1 is a perspective view of my improved implement, showing the blades closed. Fig. 2 is a longitudinal sectional view thereof. Fig. 3 is a similar view taken at right angles to Fig. 2.

Referring to the drawings, the numerals 1 and 2 indicate two semiconical-shaped blades pivotally connected together at their upper adjacent edges by bolts or rivets 3. The blade 1 is provided with an upwardly-projecting extension 4, to which is rigidly bolted an arm 6, (see Fig. 2,) and to the upper portion 5 of the blade 2 is attached a water-tank 7. The blades 1 and 2 are so constructed and arranged that when closed the edges of one blade slightly overlap the edges of the other blade, the two forming an inverted cone or funnel. Arranged on each of the pivot-bolts 3 is a hinge-plate 8, which is held rigidly in place by a bolt or rivet 9, that passes through the plate and through the blade 2. To each of the hinge-plates 8 is hinged a downwardly-projecting presser-foot 10, provided on its outer side with a web or projection 11. To each of the webs or projections 11 is loosely connected one end of a link 12, the other end of which is in like manner connected to one end of a bell-crank lever 13 14. Said bell-crank levers are fixed on the opposite ends of a rod 15, which is journaled in a suitable bearing 16, attached to the outer side of the arm 6. To the arm 14 of each of the bell-levers is pivotally connected one end of a link 17, the other end of which is in like manner connected to one end of an arm 18, which is pivotally attached to the edge of the arm 6. The inner ends of the arms 18 are pivoted to the upper ends 19 of a double crank 19 20, which is journaled in a bearing 21 on the inner side of the tank 7, the arms 18 and 19 acting as toggles to actuate the presser-feet-operating mechanism when the blades 1 and 2 are opened and closed, as will more fully hereinafter appear. Arranged in the bottom of the tank 7 is a short horizontal tube 22, that opens at its outer end over the upper end of the blade 2 and at its inner end is closed by a hinged valve 23. Pivoted in bearings 24ª, arranged at each side of the discharge end of the tube 22, is a latch 24, to the upper end of which is loosely connected one end of a push-rod 25, the free end of which is adapted to bear against the inner face of the valve 23. A swinging pawl 26 is pivoted at its upper end to the free end of the arm 20 of the crank 19 20 and at its lower end is provided with a tooth or shoulder 27, that is adapted to engage an abrupt shoulder 28, formed on the edge of the latch 24, the construction being such that when the pawl 26 is raised by the crank-arm 20 the latch 24 is swung about its pivot and forces the push-rod 25 against the valve 23, opening the latter and permitting the water to escape from the tank 7. A coiled spring 29 is attached at one end to the inner face of the valve 23 and at its other end is attached to the latch 24 below the pivot of the latter, said spring operating to hold said valve normally closed and the latch in operative position. A similar spring 30 is attached at its opposite ends respectively to the pawl 26 and the tank 7 and operates to hold the pawl in operative engagement with the latch.

Handles 31 are attached to the upper ends of the arm 6 and tank 7, and to the inner end of the arm 6 is attached a guide or hopper 32, which is adapted to receive, one at a time, the tobacco-plants and which operates to drop or direct the plants, roots down, between the blades 1 and 2. A basket or other suitable receptacle 33 is removably attached to the water-tank 7. Said basket is provided on one side with hooks 34, which are adapted to engage the upper edge of the tank 7, and at its lower edge is provided with a tongue 35, adapted to be inserted in a loop or staple 36, attached to the side of said tank. By these means the basket or receptacle may be attached to and removed from the tank at will. A cover 37 is provided for closing the upper end of the water-tank.

The operation of my improved implement is as follows: The operator grasps the handles 31 and holding the blades 1 and 2 closed forces the latter into the ground. He then selects a tobacco-plant from the basket 33 and drops it, roots down, into the guide or funnel 33, which latter drops it between the blades 1 and 2. Then by forcing the handles 31 toward each other the blades 1 and 2 are separated or opened, spreading the earth to each side and forming a cavity into which the plant drops. As the arm 6 and tank 7 approach each other the arms 18 rock the crank 19 20 on its pivot, and thus raise the pawl 26, which in turn swings the latch 24 about its pivot and forces in the push-rod 25 and opens the valve 23, permitting water to flow through the tube 22 about the roots of the plant. The valve 23 commences to open the moment the blades 1 and 2 commence to separate; but before the latter are entirely opened the latch 24 will have assumed such an inclination that the shoulder or tooth 27 will slip from off the shoulder 28 on the latch and release the latter, whereupon the spring 29 will immediately close the valve and prevent the further discharge of water. In this manner a determinate or measured quantity of water is furnished each plant, preventing waste. The same movement that sets the plant and waters it also presses or packs the earth about the roots. As the arms 18 and 19 are oscillated to open the water-valve in the manner above described the opposite ends of said arms are caused to approach each other, thus causing their adjacent connected ends to recede from the bell-crank levers 13 14 and through the medium of the links 17 rocking said levers upon their pivots and forcing down the links 12 and swinging inward the presser-feet 10. As the presser-feet are swung inward toward each other they press the earth about the roots. After the plant has been set out in the manner above described the implement is to be lifted or withdrawn from the ground, when by forcing the handles 31 apart the blades 1 and 2 are closed and the implement is in readiness for setting another plant.

I have described separately the operations of setting the plant in the ground, watering it, and packing the earth about its roots; but it will be manifest that they are performed simultaneously and at one operation.

Having described my invention, what I claim is—

1. In a plant-setter, the combination with two semiconical blades pivotally connected together at their upper, adjacent edges, of a water-tank attached to one of said blades, a valved outlet discharging between said blades, mechanism operated by the opening movement of said blades for discharging a determinate quantity of water between them, and means for normally holding said valve closed, substantially, as described.

2. In a plant-setter, the combination with two semiconical blades pivotally connected together at their upper, adjacent edges, of a water-tank attached to one of said blades, a valved outlet discharging between said blades, an arm attached to the other of said blades, handles attached to the upper ends of said arm and tank for opening and closing the blades, mechanism operated by the opening movement of the blades for opening and closing the valve to discharge a determinate quantity of water between the blades, and means for normally holding said valve closed, substantially as described.

3. In a plant-setter, the combination with two semiconical blades pivotally connected together at their upper adjacent edges, of a water-tank attached to one of said blades, a valved outlet discharging between said blades, two presser-feet arranged to swing toward and away from each other in a plane transverse to the plane in which said blades oscillate, and mechanism operated by the opening movement of the blades for opening and closing said valve to discharge a determinate quantity of water between the blades and simultaneously swing said presser-feet inward toward each other to pack the earth about the roots of the plant, substantially as described.

4. In a plant-setter, the combination with two semiconical blades pivotally connected together at their upper adjacent edges, of a water-tank attached to one of said blades, a valved outlet discharging between said blades, and mechanism operated by the opening movement of the blades for opening said valve to discharge a determinate quantity of water between the blades, and means for closing said valve before the blades are entirely opened, substantially as described.

5. In a plant-setter, the combination with two semiconical blades 1 and 2 pivotally connected together at their upper adjacent edges, of an arm fixed to the blade 1, two presser-feet pivotally connected at their upper ends to the opposite edges of the blade 2 and arranged to swing toward and away from each other in a plane transverse to the plane in which said blades oscillate, links connected at their lower ends to said presser-feet, bell-crank levers fulcrumed on said arm and pivotally connected to the upper ends of said links, oscillating supports pivotally connected at one end to the said arm and connected at their opposite ends to the bell-crank levers by links, and swinging arms pivotally connected at their upper ends to the free ends of the oscillating supports and pivoted at their lower ends to a fixed support carried by the blade 2, substantially as described.

6. In a plant-setter, the combination with two semiconical blades 1 and 2 pivotally connected together at their upper adjacent edges, of an arm fixed to the blade 1, a water-tank fixed to the blade 2, handles carried by said arm and tank for oscillating the blades, an outlet in the tank discharging between the blades, a hinged valve normally closing said outlet, a spring for holding said valve closed, a swinging latch pivoted in front of said outlet and provided with a shoulder on its lower edge, a push-rod pivoted at one end to said latch and at its other end engaging the inner face of the valve, a crank-arm fulcrumed on the water-tank, a pawl connected to said crank-arm and engaging the shoulder on the latch, and an oscillating arm pivoted at one end to the arm fixed on the blade 1 and at its other end to the said crank-arm, substantially as described.

7. In a plant-setter, the combination with two semiconical blades 1 and 2 pivotally connected together at their upper adjacent edges, of an arm fixed to the blade 1, a water-tank fixed to the blade 2, handles carried by said arm and tank for oscillating the blades, an outlet in the tank discharging between the blades, a hinged valve normally closing said outlet, a swinging latch pivoted in front of said outlet and provided with a shoulder on its lower edge, a push-rod pivoted at one end to said latch and at its other end engaging the inner face of said valve, a coiled spring attached at its opposite ends respectively to said latch and valve, a crank-arm fulcrumed on the water-tank, a pawl suspended from said crank-arm and provided with a shoulder, a spring for normally holding the shoulder on the pawl in engagement with the shoulder on the latch, and an oscillating arm pivoted at one end to the arm fixed on the blade 1 and at its other end to the said crank-arm, substantially as described.

In testimony whereof I have hereunto set my hand in presence of two subscribing witnesses.

CHRISTOPHER G. HIGGINS.

Witnesses:
 GUY H. FOSSITT,
 B. C. H. SIMPSON.